May 12, 1942.  S. C. EWING  2,282,955
CONTROL SYSTEM FOR SYNCHRONOUS MACHINES
Filed Aug. 27, 1940
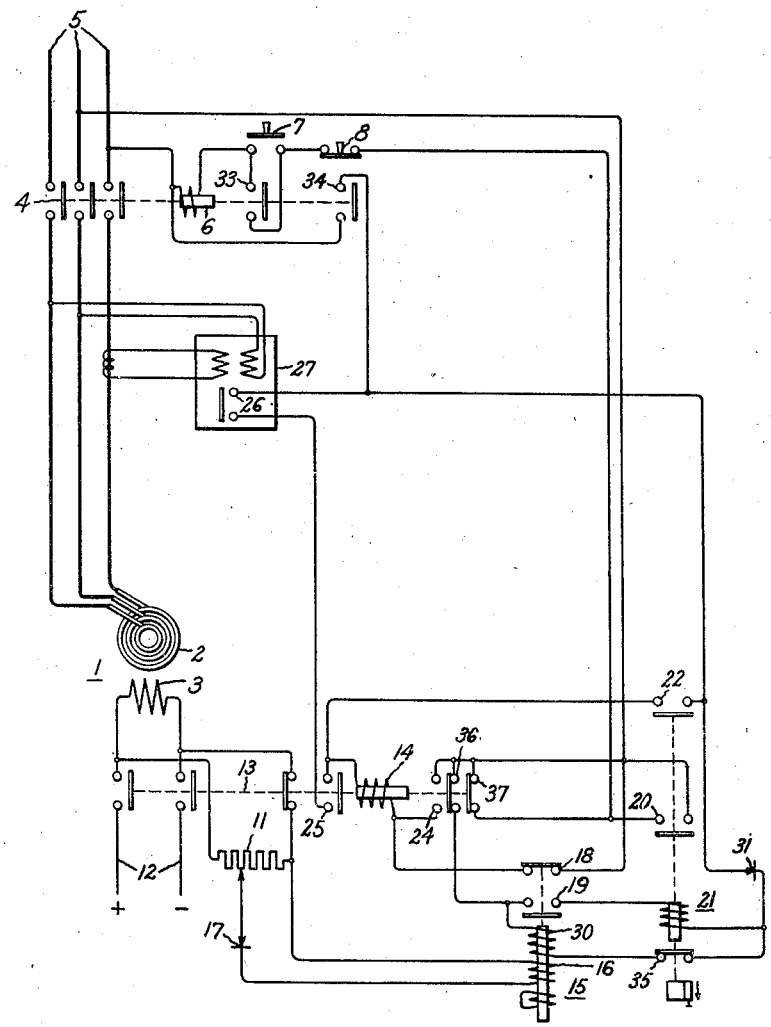
Inventor:
Samuel C. Ewing,
by Harry E. Dunham
His Attorney.

Patented May 12, 1942

2,282,955

UNITED STATES PATENT OFFICE 2,282,955

CONTROL SYSTEM FOR SYNCHRONOUS MACHINES

Samuel C. Ewing, Scotia, N. Y., assignor to General Electric Company, a corporation of New York Application August 27, 1940, Serial No. 354,374

5 Claims. (Cl. 172—289)

My invention relates to control systems for synchronous machines and particularly to synchronous motor control systems, and an object of my invention is to provide an improved arrangement for controlling the application and removal of the field excitation of a synchronous machine.

In United States Letters Patent 1,896,074 granted February 7, 1933 on an application filed by me and assigned to the assignee of this application there is disclosed and claimed a synchronous motor field excitation control system, and my present invention is an improvement of that arrangement in that the improved arrangement requires fewer timing devices and, therefore, is a cheaper and simpler arrangement.

My invention will be better understood from the following description when taken in connection with the accompanying drawing the single figure of which is a diagrammatic showing of a synchronous motor control system embodying my invention, and the scope of my invention will be pointed out in the appended claims.

Referring to the drawing, 1 represents a synchronous motor having an armature winding 2 and a field winding 3.

In order to simplify the disclosure, I have shown my invention in connection with a full voltage starting arrangement for the synchronous motor in which the motor is started by connecting the armature winding 2, by means of a suitable line switch 4, directly across an alternating current supply circuit 5. With such an arrangement normal voltage is supplied to the motor armature winding to start the motor from rest and bring it up to approximately synchronous speed as an induction motor. It is to be understood, however, that my invention is applicable to any other suitable arrangement for starting and accelerating the synchronous motor to approximately synchronous speed as an induction motor. As shown in the drawing, the line switch 4 has a closing coil 6 which is arranged to be connected across one phase of the supply circuit 5 when a suitable "start" switch 7 is closed. This "start" switch 7 may be a float switch, time switch, thermostat, or any other suitable control device, examples of which are well known in the art, for initiating the starting operation of the motor. In the circuit of the closing coil 6 I provide the normally closed contacts of a suitable manually controlled "stop" switch 8 which is operated when it is desired to stop the motor. The line switch 4, when closed, completes for its closing coil 6 a locking circuit which is independent of the "start" switch 7 so that this switch may be opened without effecting the opening of the switch 4.

The field winding 3 of the motor 1 is normally short-circuited through a discharge resistor 11 and is arranged to be connected to a suitable source of excitation 12 when the motor 1 reaches a predetermined speed. In the particular arrangement shown in the drawing a two-position field switch 13 is provided for controlling the connections of the field winding 3. In one of its positions the field switch 13 connects the discharge resistor 11 across the terminals of the field winding 3, and in its other position it connects the field winding 3 to the source of excitation 12. The field switch 13 is provided with a closing coil 14 which, when energized, operates the switch so as to disconnect the field winding 3 from the discharge resistor 11 and connect the field winding 3 to the source of excitation 12. For effecting the energization of the closing coil 14 when the motor 1 reaches substantially synchronous speed, I employ a time relay 15 having a winding 16 connected in series with a half wave rectifier 17 across a portion or all of the discharge resistor 11. With such an arrangement the induced current which flows through the motor field winding 3, while the motor 1 is operating below synchronous speed, causes sufficient pulsating current to flow through the winding 16 to maintain the armature of the relay 15 in its attracted position to close 19 and open 18 until the motor reaches approximately synchronous speed at which time the frequency of the induced current becomes so low that the portion of each cycle of induced field current during which no current flows through the relay winding 16 is sufficiently long to allow the relay armature to be restored to its normal position.

In the arrangement shown, the relay 15 is provided with contacts 19 which are closed when the relay armature is in its attracted position and with contacts 18 which are closed when the relay armature is in its normal position. The contacts 18 are connected in series with the closing coil 14 of the field switch 13 so that it can be closed only when the frequency of the induced field current is below a predetermined value and, therefore, the motor speed is above a predetermined subsynchronous speed.

The contacts 19 of relay 15 are connected in the energizing circuit of a suitable time delay drop-out relay 21 which, when in its energized position, closes its contacts 22, which are also in series with the closing coil 14 of the field switch 13. Therefore, in order to close the field switch 13, the relay 15 must first close its contacts 19 so as to effect the energization of relay 21 and then must close its contacts 18 while the relay 21 is still in its energized position. When the field switch 13 closes, its auxiliary contacts 24 complete a shunt circuit around the contacts 18 of the relay 15, and its auxiliary contacts 25 in series with the contacts 26 of a suitable pull-out relay 27 complete a shunt circuit around the contacts 22 of the relay 21. The pull-out relay 27 is connected to the motor 1 in any suitable manner, examples of which are well known in the art, so that its contacts 26 are opened when the motor 1 falls out of synchronism. In the particular embodiment shown in the drawing, the pull-out relay 27 is a power-factor relay which is connected to the armature circuit of the motor 1 and which is arranged in any suitable manner so that it opens its contacts 26 in response to the power-factor of the motor armature circuit decreasing below a predetermined lagging value.

Since the relay 21 is a time delay drop-out relay, the contacts 22 thereof remain closed for a sufficient length of time after the field switch 13 closes to prevent any momentary opening of the contacts 26 of the pull-out relay 27, during the synchronizing operation of the motor 1, from effecting the opening of the field switch 13.

In some cases it has been found in practice that, if the motor load is removed at the time of pull-out and field removal, as for example in an arrangement in which the opening of the field is arranged to effect the operation of an unloader, the speed of the motor may not drop to a sufficiently low value after the opening of the field switch to cause sufficient current to flow through the winding 16 of the relay 15 to pick up this relay. In order to insure that the relay 15 moves to its energized position and effects the energization of relay 21 under such conditions, I provide the relay 15 with a second winding 30 the circuit of which is completed across one phase of the supply circuit 5 through a suitable rectifier 31 when the line switch 4 is closed, the field switch 13 is opened, and the relay 21 is in its deenergized position. Therefore, when the motor 1 is pulled out of step, there is no possibility of the motor running indefinitely without field excitation due to the speed of the motor remaining too high after pull out to effect the proper operation of the relays 15 and 21.

The operation of the embodiment of my invention shown in the drawing is as follows:

When it is desired to start the motor 1, the "start" switch 7 is closed so that an energizing circuit is completed for the closing coil 6 of the line switch 4 across one phase of the supply circuit 5. This energizing circuit also includes the normally closed contacts of the "stop" switch 8 and the contacts 37 of the field switch 13. The energization of the closing coil 6 closes the line switch 4 so that normal voltage is applied to the motor armature winding 2 to start the motor 1 from rest and accelerate it as an induction motor to approximately synchronous speed. By closing its auxiliary contacts 33, the line switch 4 completes for the closing coil 6 a locking circuit, which is independent of the "start" switch 7, so that this switch may be opened without effecting the opening of the line switch 4. By closing its auxiliary contacts 34, the line switch 4 completes across one phase of the supply circuit an energizing circuit for the winding 30 of the relay 15 so that this relay is immediately moved to its operated position. This energizing circuit also includes the rectifier 31, the contacts 35 of the relay 21, and the auxiliary contacts 36 of the open field switch 13.

As soon as the motor armature winding 2 is energized, a voltage of slip frequency is induced in the motor field winding 3, and this voltage causes a current of slip frequency to flow through the field winding 3 and the discharge resistor 11 and causes a pulsating current to flow through the winding 16 of the relay 15. Until the motor 1 reaches substantially synchronous speed, the magnitude and frequency of the current through the winding 16 are such that the relay maintains its armature in its attracted position so that the contacts 19 are closed, and the contacts 18 are open. The closing of the contacts 19 of relay 15 completes an energizing circuit for the winding of relay 21 through the rectifier 31, contacts 36 of field switch 13, and the contacts 34 of the line switch 4. By closing its contacts 20, the relay 21 completes a shunt circuit around contacts 37 of the field switch 13 and by opening its contacts 35, the relay 21 interrupts the circuit of the winding 30 of relay 15. The winding 16, however, maintains the relay 15 in its energized position until the motor reaches a predetermined subsynchronous speed when the frequency of the induced current in the field winding 3 and resistor 11 becomes so low that the portion of each cycle during which no current flows through the winding 16 is sufficiently long to allow the relay 15 to open its contacts 19 and close its contacts 18. The closing of the contacts 18 completes, through the contacts 22 of relay 21 and the contacts 34 of the line switch 4, an energizing circuit for the closing coil 14 so that the field switch 13 is closed to connect the field winding 3 across the source of excitation 12. The motor then pulls into synchronism and thereafter operates at synchronous speed until the load is increased to a sufficient value to pull the machine out of its synchronism or the "stop" switch 8 is opened to stop the motor. By opening its contacts 19, the relay 15 interrupts the energizing circuit of the time relay 21, but the contacts 22 of this relay remain closed for a predetermined time after the relay is deenergized.

By closing its auxiliary contacts 24, the field switch 13 completes a shunt circuit around contacts 18 of relay 15 and by closing its contacts 25, which are in series with the contacts 26 of the pull-out relay 27, the field switch 13 completes a shunt circuit around the contacts 22 of the relay 21.

In case the motor is pulled out of synchronism for any reason, the power-factor of the motor armature circuit decreases to a sufficiently low lagging value to cause the pull-out relay 27 to open its contacts 26 in the holding circuit of the closing coil 14 so that the field switch 13 is opened to disconnect the field winding 3 from the source of excitation 12 and to reconnect the discharge resistor 11 across the field winding 3. As soon as the field switch 13 opens, the heretofore described circuit for the winding 30 of the relay 15 is completed to cause the relay 15 to be moved to its energized position and thereby effect, in the manner heretofore described, the energization of the relay 21. As long as the motor continues to rotate at a sub-synchronous speed below the drop-out value of the relay 15, the field switch 13 remains open. However, as soon as the motor is again operating at, or above, the desired synchronizing speed, the relay 15 closes its contacts 18 and effects the closing of the field switch 13 in the manner heretofore described.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, a synchronous machine having an armature winding and a field winding, means for supplying alternating current to said armature winding, a source of excitation, a field switch for connecting said source to said field winding, a relay having a normal position and an operated position and a winding energized in response to the induced current in said field winding when said machine is operating subsynchronously, a second relay having a normal position and an operated position, means responsive to the movement of said first mentioned relay to its operated position for moving said second relay to its operated position, means controlled by said relays for closing said field switch when said first mentioned relay is in its normal position and said second relay is in its operated position, means for opening said field switch, a second winding for said first mentioned relay, and means for energizing said second winding when said field switch is open and said second relay is in its normal position.

2. In combination, a synchronous machine having an armature winding and a field winding, means for supplying alternating current to said armature winding, a source of excitation, a field switch for connecting said source to said field winding, a relay having a normal position and an operated position, a second relay having a normal position and an operated position, means responsive to the movement of said first mentioned relay to its operated position for moving said second relay to its operated position, means for causing said first mentioned relay to move to its operated position when said motor is operating below a predetermined subsynchronous speed and to its normal position when said motor is operating above said predetermined subsynchronous speed, means for moving said first mentioned relay to its operated position when said field switch is open and said second relay is in its normal position, and means controlled by said relays for closing said field switch when said first mentioned relay is in its normal position and said second relay is in its operated position.

3. In combination, a synchronous machine having an armature winding and a field winding, means for supplying alternating current to said armature winding, a source of excitation, a field switch for connecting said source to said field winding, a relay having a normal position and an operated position and a winding energized in response to the induced current in said field winding when said machine is operating subsynchronously, a time delay drop-out relay, means for energizing said time relay while said first mentioned relay is in its operated position, means controlled by said relays for closing said field switch when said first mentioned relay is in its normal position and said time relay is in its energized position, means for opening said field switch, and means for moving said first mentioned relay to its operated position when said field switch is open and said time relay is in its drop-out position.

4. In combination, a synchronous machine having an armature winding and a field winding, means for supplying alternating current to said armature winding, a source of excitation, a field switch for connecting said source to said field winding, a relay having a normal position and an operated position and a winding energized in response to the induced current in said field winding when said machine is operating subsynchronously, a time delay drop-out relay, means for energizing said time relay while said first mentioned relay is in its operated position, means controlled by said relays for closing said field switch when said first mentioned relay is in its normal position and said time relay is in its energized position, means for opening said field switch, a second winding for said first mentioned relay, and means for energizing said second winding when said field switch is open and said time relay is in its drop-out position.

5. In combination, a synchronous machine having an armature winding and a field winding, an alternating current circuit connected to said armature winding, a source of excitation, a field switch for connecting said source to said field winding, a relay having a normal position and an operated position and a winding energized in response to the induced current in said field winding when said machine is operating subsynchronously, a time delay drop-out relay, means for energizing said time relay while said first mentioned relay is in its operated position, means controlled by said relays for closing said field switch when said first mentioned relay is in its normal position and said time relay is in its energized position, means for opening said field switch, a second winding for said first mentioned relay, rectifying means, and means controlled by said field switch and said time relay for connecting said second winding and said rectifying means in series across said alternating current circuit when said field switch is open and said time relay is in its drop-out position.

SAMUEL C. EWING.